United States Patent [19]

Conley

[11] 4,077,874

[45] Mar. 7, 1978

[54] METHOD REMOVING RADIOACTIVITY FROM KAOLIN

[76] Inventor: Robert F. Conley, 2675 Deerpath La., Scotch Plains, N.J. 07076

[21] Appl. No.: 588,265

[22] Filed: Jun. 19, 1975

[51] Int. Cl.$^2$ ............................................. B03D 3/00
[52] U.S. Cl. ...................................... 209/5; 209/155; 210/54; 423/118
[58] Field of Search ...................... 209/5, 155; 210/53, 210/54 A, 54 C, 54 R; 423/118; 106/72, 288 B; 252/101.1 R

[56] References Cited

U.S. PATENT DOCUMENTS

| 1,791,959 | 2/1931 | Feldenheimer | 209/5 |
|---|---|---|---|
| 2,509,585 | 5/1950 | Brown | 209/5 X |
| 2,981,630 | 4/1961 | Rowland | 210/54 R X |
| 3,020,231 | 2/1962 | Colwell | 209/5 X |
| 3,147,218 | 9/1964 | Booth | 210/54 C |
| 3,303,184 | 2/1967 | Nordgren | 210/54 C |
| 3,692,671 | 9/1972 | Recht | 210/53 X |
| 3,808,021 | 4/1974 | Maynard | 423/118 X |
| 3,890,045 | 7/1975 | Preteus | 210/53 X |

Primary Examiner—Robert Halper
Attorney, Agent, or Firm—Omri M. Behr

[57] ABSTRACT

A method of reducing the radioactivity found in naturally occurring kaolins to about 40% below its native value, and the leachable radiogenic components to less than 20%. This reduction is achieved by removing from the kaolin particles of a size less than 0.5 microns. This removal may be carried out by gravitational settling, flocculation of non-colloidal particles, or acid leaching.

13 Claims, No Drawings

METHOD REMOVING RADIOACTIVITY FROM KAOLIN

BACKGROUND OF THE INVENTION

1. Field of the Invention

Reduction of radioactivity in clays.

2. Description of the Prior Art

Kaolin is a form of clay which has been used for many purposes because of its whiteness and relative purity. Certain kaolins, such as Georgia kaolins are known to have a very low heavy metal content, that is to say, less than 10 parts per million of heavy metals such as mercury, arsenic lead, cadmium, and selenium. The kaolins have therefore found use in applications such as pharmaceutical preparations including antidiarrhetics, toothpaste, cosmetics, and food wrapping materials. Such uses continue since Georgia kaolins heretofore were believed to meet the FDA maximum tolerance for heavy and toxic metals in material coming into contact with humans or human food at 10 parts per million.

It is now known that kaolins contain significant radioactive materials. These radioactive materials fall into three general categories.

The first category includes heavy metal natural radiogenic elements such as uranium, thorium, radium and their daughter isotopes; these elements are of course usually found as compounds with other elements.

Secondly, radioactivity may be due to fallout materials from nuclear testing which includes relatively short lived isotopes and some relatively heavy metal isotopes.

Thirdly, radiogenic potassium is found to occur in one part per 10 thousand of natural potassium.

Analysis of kaolin samples from different locales shows a considerable variation in the amount and energy distribution of the emissions, thus indicating inconsistencies in the origin of the radioactivity. Of all three sources indicated the least hazardous is the radiopotassium, $K_{40}$, since its occurrence is of the order of between 0.1 and 0.02 parts per million in the kaolins. Furthermore, potassium is an element which is excreted fairly rapidly from the human body and therefore does not constitute a long range hazard.

Heavy metal compounds and fall-out radiogenic materials can, if present in sufficient amounts, constitute a substantial health hazard since once absorbed by the body they tend to accumulate therein. Thus, in the case of anti-diarrhetics which are compounded with kaolin, there is a direct intake into the digestive systems and, due to the chemical, and particularly the acid nature of the stomach fluids, there is a tendency to dissolve such compounds whereby they are converted into a condition which permits them to be absorbed through the membranes of the body. Similarly, when used as cosmetics, the chemical nature of the skin may, over a long period of time, leach such elements into the body's membranes. In addition, long term contact with radiogenic clays will, itself, produce radiation damage to tissues. Heretofore, kaolin has not been considered as a material giving rise to radiation hazards.

Recently the Atomic Energy Commission pursuant to the Occupational Safety and Hazards Act, has set certain maximum radiation exposure levels to external materials. The permissible radiation exposure is measured in units of radiation damage to the body produced by beta, gamma, or both forms of radiation and designated as the rem. The permissible standards have been set at 1.25 rems per 3 months with respect to workers and other personnel wearing protective shielding and 0.125 rems where the exposee does not wear protective equipment.

SUMMARY OF THE INVENTION

In accordance with the process of the present invention I have found that a substantial proportion of the heavy metal radiation, that is to say, the beta and gamma radiation of kaolin, that is to say, at least 30% and, under favorable circumstances as much as 50%, more usually about 40%, may be removed by removing from the kaolin a substantial proportion of the finer particles, suitably those particles having a diameter of less than 0.5 microns or even 0.2 microns or below. Most of these particles may be most readily removed by gravity settling, that is to say, by preparing an aqueous suspension of the kaolin, usually with the assistance of dispersing agents, and removing from the settling tank the upper portion of the suspension which contains the fine particles which in turn are the source of most of the radioactivity.

In a variation of this procedure the colloidal particles may be removed by flocculation of the heavier particles. In yet another embodiment the same result may be achieved by acid treatment, suitably with mineral acid, of the kaolin whereby the radioactivity is reduced by a substantially equivalent amount.

I have further discovered that the treatment of particles greater than 0.5 microns in diameter derived from kaolins which has been subjected to gravity settling procedures as mentioned hereinabove, were not substantially affected by acid leaching with respect to their gamma and beta radiation. The reduction in the emission of such particles after leaching was less than 10%, that is to say, of the order of 3 to 5% reduction in the radiation value of the starting kaolin. It is thus to be concluded that the readily removable portion of the particles responsible for the radiation is the particles less than 0.5 microns in diameter.

DESCRIPTION OF THE PREFERRED EMBODIMENTS

It is to be understood that the nature of the radiation from kaolin falls into three categories — alpha, beta and gamma radiation. Alpha radiation is of only short path length in air and even shorter in matter and is therefore of very little interest in the evaluation of residual and damaging radiation. The radiation discussed hereinbelow is set forth in two ways. First, as heavy metal radio isotope equivalent (HMRE) which is calculated based on translating the total beta and gamma radiation to that which would have been emitted by a certain concentration of thorium. A second parameter is that of rems which is the radiation damage standards set by the Federal Government. A third parameter is the total radiation count. In evaluating the figures given hereinbelow, the accurary of said figures should be considered as ±5%.

In evaluating the HMRE equivalence, it will be seen that the radiation values of the untreated materials substantially exceed the FDA permitted minimum of 10 ppm. Even after treatment this minimum is still exceeded but of course the excess has been reduced approximately by a factor of 2. More significantly, the leachable radiogenic materials is nearly completely removed.

In the preferred embodiments of the present invention there is prepared a suspension of degritted kaolin in water. It has been found suitable to prepare a suspension at an initial level of approximately 30% by weight of solids which are then slurried, suitably under high shear. This slurrying process may proceed for from about 15 to about 30 minutes. If desired, and it is common to do so, a dispersing agent may be added to the kaolin particles prior to the slurrying stage. Among the dispersing agents which may be used are tetrasodiumpyrophoshate, 2-amino-2-methyl 1-propanol, sodium hexametaphosphate (Calgon), sodium tripolyphosphate, sodium silicate.

After the initial slurrying step, the slurry is further diluted, suitably to a level of about 10% solids. The slurries are then allowed to settle. It has been found that a satisfactory settling time at ambient temperatures, that is to say, between about 20° and about 30° C, is from about 5 to about 10 hours times the slurry height in centimeters. The upper two-thirds (by volume) of the settled slurry is then removed and discarded. An equivalent volume of water may, if desired, be added, the suspension reslurried and the settling process repeated. It has been found that approximately 90% of the radioactivity which can be removed by these procedures will be removed by the double separation steps so that it is not necessary or desirable to repeat the slurrying process more than once.

In place of gravitational settling, one skilled in the art may shorten the separation time by employing centrifugation procedures.

In a modification of this embodiment, the kaolin slurry is passed between the poles of a very high power magnet. Field strengths of the order of 10 to 30 kilogauss have been utilized. It was noted that by subjecting the suspension to said magnetic field, the radioactivity thereof was reduced somewhat, suitably of the order of about 10%. This modification, though operative, should not therefore be considered as a preferred modification.

In place of gravitational settling, the same effect may be achieved by flocculation of the coarser particles.

In this modification a mild flocculating agent is added to the slurry, between 0.01 and 0.5, suitably about 0.1% of the flocculating agent based on clay weight is suitable.

The use of strong flocculating agents is not desirable as these will flocculate the fines as well. Among the suitable agents are lower alkanols having 1-5 carbon atoms, water soluble ketones suitably those with 1-5 carbon atoms, long chain polyhydric alcohols, suitably polyethylene glycols having molecular weights of up to about 10,000 — the limitation here however being water solubility not molecular weight, very high molecular weight, water soluble starches and water soluble gums and high molecular weight, i.e. 1-10 million, solubilized polyacrylamides. One effective such material consists of a copolymer of 8-12% sodium polyacrylate and 88-92% acrylamide.

The flocculating agents are added to the slurry which then settles rapidly — say within 30-60 minutes. The non-flocculated material is removed, suitably siphoned off. The material redispersed and permitted to resettle and the supernate again removed. This procedure permits removal of the fines which constitute about 2-5% by weight of the unfractionated clay. If desired the residual material may be washed with water to remove all remaining traces of the flocculating agent.

EXPERIMENTAL

In the Examples set forth hereinbelow, the radioactivity is measured in three different ways.

1. Emiss/min/lb is the total emissions per minute per pound. This total radiation count represents the sum of the beta and gamma emissions since alpha radiation has an insufficient path length in air and matter to be properly measured.

2. The second parameter is the heavy metal radioisotope equivalent (HMRE). This figure is the theoretical amount of thorium (in parts per million by weight), which would generate the given amount of beta and gamma radiation.

3. The third parameter rems/min/lb is the amount of gram tissue damage per minute per pound in rems.

The figures given hereinbelow are the averages of several determinations and have an accuracy of about $\pm 5\%$.

EXAMPLE I

Samples of two commercial kaolin grades from a single source but representing samples of production from each of 10 successive years were subjected to analysis of their radioactive emissions. Said analysis gave the following results:

| Year | Grade | Emiss/min/lb* | Rems/min/lb* | HMRE, ppm |
|------|-------|---------------|--------------|-----------|
| 1964 | A | 49700 | $1.32 \times 10^{-8}$ | 41 |
| 1964 | B | 59800 | $1.58 \times 10^{-8}$ | 50 |
| 1965 | A | 55000 | $1.46 \times 10^{-8}$ | 46 |
| 1965 | B | 73500 | $1.95 \times 10^{-8}$ | 61 |
| 1966 | A | 56600 | $1.50 \times 10^{-8}$ | 47 |
| 1966 | B | 62100 | $1.64 \times 10^{-8}$ | 52 |
| 1967 | A | 57200 | $1.52 \times 10^{-8}$ | 48 |
| 1967 | B | 59800 | $1.58 \times 10^{-8}$ | 50 |
| 1968 | A | 55600 | $1.47 \times 10^{-8}$ | 46 |
| 1969 | A | 60800 | $2.29 \times 10^{-8}$ | 51 |
| 1969 | B | 63400 | $1.68 \times 10^{-8}$ | 53 |
| 1970 | A | 57900 | $1.53 \times 10^{-8}$ | 48 |
| 1970 | B | 79700 | $2.11 \times 10^{-8}$ | 66 |
| 1971 | A | 55000 | $1.45 \times 10^{-8}$ | 46 |
| 1971 | B | 80400 | $2.13 \times 10^{-8}$ | 67 |
| 1973 | A | 55700 | $1.47 \times 10^{-8}$ | 46 |
| 1973 | B | 59900 | $1.58 \times 10^{-8}$ | 50 |

*(beta + gamma)

EXAMPLE II

Samples of kaolin from various different geographical areas were subjected to grit removal and thereafter analyzed for their beta and gamma radiation with the results set forth hereinbelow. Sample 7 was selected as a suitable sample for carrying out most of the experimental procedures of the present invention.

| Sample | Emiss/min/lb | Rems/min/lb | HMRE,ppm |
|--------|--------------|-------------|----------|
| 1 | 65000 | $1.72 \times 10^{-8}$ | 54 |
| 2 | 33800 | $0.90 \times 10^{-8}$ | 28 |
| 3 | 48100 | $1.27 \times 10^{-8}$ | 40 |
| 4 | 214800 | $5.69 \times 10^{-8}$ | 178 |
| 5 | 31200 | $0.83 \times 10^{-8}$ | 26 |
| 6 | 74100 | $1.96 \times 10^{-8}$ | 62 |
| 7 | 113000 | $2.99 \times 10^{-8}$ | 94 |
| 8 | 18200 | $0.48 \times 10^{-8}$ | 15 |

EXAMPLE III

High Field Strength Magnetic Separation

A suspension of Sample 7 (20% by weight) was prepared in water in the presence of tetrasodiumpyrophosphate (0.5% by weight) at pH 6.8. The suspension was subjected to very high shear mixing (Waring Type Blender at approximately 18 krpm., 20 minutes) and passed through a cell located between the pole faces of a magnet (pole face gap; 1/16 inch, field strength at cell center; about 20 Kgauss, transit time through cell; circa 8 seconds). The product was separated from the suspending aqueous medium, dried and designated as Sample 9. In accordance with the foregoing procedures, a second sample was similarly subjected to the magnetic field but in place of pH 6.8, the pH was 8.5. The product was similarly separated from the aqueous medium, dried and designated as Sample 10.

In accordance with the procedure of the first embodiment hereinabove, a sample was passed through the cell but in place of a transit time of 8 seconds there was utilized a transit time of 240 seconds. The aqueous suspension was then again worked up to separate the solid material from the suspending medium, dried, and designated as Sample 11. The magnetically retained portion from this experiment was similarly dried and designated as Sample 12.

The radioactivity of all of the foregoing Samples 9 through 12, was analyzed and is set forth hereinbelow.

| Sample | Emiss/min/lb | Rems/min/lb | HMRE, ppm |
|---|---|---|---|
| 7 a (repeat) | 113000 | $2.99 \times 10^{-8}$ | 94 |
| 9 | 95400 | $2.53 \times 10^{-8}$ | 79 |
| 10 | 99000 | $2.62 \times 10^{-8}$ | 82 |
| 11 | 96700 | $2.56 \times 10^{-8}$ | 80 |
| 12 | 223000 | $5.91 \times 10^{-8}$ | 184 |

Summmary of Results

1. The resident time in the cell is substantially irrelevant to the efficiency of the process. 2. A pH closer to 7 is more effective than a pH of substantially alkalinity. 3. This method has an efficiency of approximately 16% removal of radiogenic contamination.

EXAMPLE IV

Three samples of kaolin (not derived from Sample 7 supra) were degritted. The samples were dispersed in accordance with the procedures of the principal embodiment of Example III. The dispersion was allowed to settle under gravity for 168 hours (20 cm) and three fractions taken from each sample dispersion. The first fraction constituting the lower most fraction constituting the compacted sediment (about 2 cm) of the settled material comprised particles of which approximately 100% were greater than 1 micron in diameter, the second fraction constituting about the next higher 15 cm of the suspension comprised a size distribution of from 10 microns down to 0.1 microns whereof about 50% of the particles had a size of approximately 1 micron. The third, or upper most fraction (3 cm) comprised particles approximately 100% of which had a diameter of less than 1 micron. The fractions are designated with the suffix c, i and f respectively. After separation into the fractions, the fractions were further separated from the suspending medium, dried, and their radioactivity measured. The results are set forth in the Table below.

| Sample | %>1μm | %<1μm | Emiss/min/lb | Rems/min/lb | HMRE, ppm |
|---|---|---|---|---|---|
| 13-c | 97 | 3 | 26700 | $0.70 \times 10^{-8}$ | 22 |
| 13-i | 43 | 57 | 72600 | $1.92 \times 10^{-8}$ | 60 |
| 13-f | 5 | 95 | 106800 | $2.83 \times 10^{-8}$ | 89 |

-continued

| Sample | %>1μm | %<1μm | Emiss/min/lb | Rems/min/lb | HMRE, ppm |
|---|---|---|---|---|---|
| 14-c | 99 | 1 | 27000 | $0.72 \times 10^{-8}$ | 23 |
| 14-i | 44 | 56 | 63500 | $1.68 \times 10^{-8}$ | 53 |
| 14-f | 6 | 94 | 139000 | $3.67 \times 10^{-8}$ | 115 |
| 15-c | 97 | 3 | 22800 | $0.61 \times 10^{-8}$ | 19 |
| 15-i | 35 | 65 | 52100 | $1.37 \times 10^{-8}$ | 43 |
| 15-f | 4 | 96 | 78500 | $2.08 \times 10^{-8}$ | 65 |

Summary of the Results

The foregoing results show that the major portion of the radioactive contaminants reside in the fraction comprising particles having a diameter of less than 1 micron.

EXAMPLE V

In accordance with the procedures of the principal embodiment of Example III, four suspensions of Sample 7 kaolin were prepared, in place of a 20% suspension, the suspensions were 10% by weight, in place of 0.5% tetrasodiumpyrophosphate, the amount of dispersing agent was 1%, utilizing dispersing agents and pH values set forth hereinbelow. The kaolin dispersions were fractionated by gravitational sedimentation and fractions taken in the following size ranges. $c'$ — 2 microns to 0.5 microns; $i'$ — 0.5 microns to 0.2 microns; $f'$ — 0.2 microns to 0 microns.

The aforesaid three fractions were separated into aqueous medium and solid phase, the solid phase dried and analyzed for radioactivity. The results are set forth hereinbelow.

| Sample | pH | Dispersant | Size Range, μm | Emiss/min/lb | Rems/min/lb | HMRE, ppm |
|---|---|---|---|---|---|---|
| 16-c' | 8.3 | TSPP | 2 to 0.5 | 67800 | $1.8 \times 10^{-8}$ | 56 |
| 16-i' | " | " | 0.5 to 0.2 | 117200 | $3.10 \times 10^{-8}$ | 97 |
| 16-f' | " | " | 0.2 to 0 | 135400 | $3.59 \times 10^{-8}$ | 112 |
| 17-c' | 9.3 | AMP | 2 to 0.5 | 72900 | $1.93 \times 10^{-8}$ | 61 |
| 17-i' | " | " | 0.5 to 0.2 | 107400 | $2.85 \times 10^{-8}$ | 89 |
| 17-f' | " | " | 0.2 to 0 | 141900 | $3.76 \times 10^{-8}$ | 118 |
| 18-c' | 10.2 | AMP NaOH | 2 to 0.5 | 74900 | $1.98 \times 10^{-8}$ | 62 |
| 18-i' | " | " | 0.5 to 0.2 | 110700 | $2.93 \times 10^{-8}$ | 92 |
| 18-f' | " | " | 0.2 to 0 | 125000 | $3.31 \times 10^{-8}$ | 104 |
| 19-c' | 11.0 | AMP NaOH | 2 to 0.5 | 105800 | $2.80 \times 10^{-8}$ | 88 |
| 19-i' | " | " | 0.5 to 0.2 | 97600 | $2.59 \times 10^{-8}$ | 81 |
| 19-f' | " | " | 0.2 to 0 | 86300 | $2.29 \times 10^{-8}$ | 72 |

Summary

The bulk of the emissions is contributed by samples of less than 0.5 microns, in particular, by samples less than 0.2 microns. Differentiation in particle size improves with decreasing pH.

EXAMPLE VI

A sample of kaolin Sample 7 was dispersed at 30% solids in the presence of 1% tetrasodiumpyrophosphate under high shear for 20 minutes and then diluted to 10% solids with water.

The dispersion was divided into four parts and adjusted to pH's between 8 and 11 as set forth below during further agitation. To each of these samples is added a water soluble synthetic gum (copolymer of 8—12% sodium acrylate, 88–92% acrylamide, molecular weight — 1–10 million, 0.1% by weight, based on kaolin weight, predissolved in water). The slurry is then allowed to settle for 30 minutes, the supernatant liquid containing the colloidal particles siphones off and the thus removed liquid replaced with water followed by mild mixing, settling and further siphoning. The flocculated clay was then filtered, washed, dried, and the radioactivity of the flocculated particles measured.

| Sample | pH | Emis/min/lb | Rems/min/lb | HMRE, ppm |
|---|---|---|---|---|
| 20 | 8.0 | 72000 | $1.91 \times 10^{-8}$ | 60 |
| 21 | 9.0 | 64100 | $1.70 \times 10^{-8}$ | 53 |
| 22 | 10.0 | 60900 | $1.61 \times 10^{-8}$ | 51 |
| 23 | 11.0 | 65800 | $1.74 \times 10^{-8}$ | 55 |
| 7b repeat #2 | — | 108100 | $2.86 \times 10^{-8}$ | 90 |

Summary

Radioactivity is reduced by approximately 40% over pH range of 8 through 11 with superior results between pH 9 and 11. The clay weight loss in this method is 2% or less. In accordance with the above procedures but in place of the sodium acrylate-acrylamide copolymer there may also be employed methanol, ethanol, methylethyl ketone, or polyethylene glycol (10,000) to achieve a similar result.

EXAMPLE VII

A sample of kaolin Sample 7 was dispersed in accordance with the initial procedures of Example VI. The dispersion was then treated with chlorine (0.025% based on clay weight) at pH 4.5 at 50° C for 30 minutes. The dispersion was then cooled and divided into four parts. Thereafter the pH was adjusted in each part and the gum added in accordance with the remaining portion of the procedures of Example VI and the samples of clay separated similarly in accordance with the remaining procedures of Example VI. The activity data for the aforementioned samples are set forth in the table hereinbelow.

| Sample | pH | Emis/min/lb | Rems/min/lb | HMRE, ppm |
|---|---|---|---|---|
| 24 | 8 | 76200 | $2.02 \times 10^{-8}$ | 63 |
| 25 | 9 | 64200 | $1.70 \times 10^{-8}$ | 53 |
| 26 | 10 | 62800 | $1.66 \times 10^{-8}$ | 52 |
| 27 | 11 | 88900 | $2.36 \times 10^{-8}$ | 74 |
| 7c repeat #3 | — | 112900 | $2.99 \times 10^{-8}$ | 94 |

EXAMPLE VIII

Acid Leach

Samples of kaolin Sample 7 were slurried at 10% solids, and hydrochloric acid added to the samples to provide various pH levels. Samples were agitated every 6 to 8 hours at 25° for a total of 120 hours in order to maintain the slurry in suspension. After 120 hours, the suspension was permitted to settle, the slurry washed free of acid, permitted to resettle, the supernate removed, the settled particles filtered and dried and the radioactivity of each sample measured. The results are set forth in the table below.

| Sample | pH | Emiss/min/lb | Rems/min/lb | HMRE, ppm |
|---|---|---|---|---|
| 28 | 3 | 96700 | $2.56 \times 10^{-8}$ | 80 |
| 29 | 2 | 80400 | $2.13 \times 10^{-8}$ | 67 |
| 30 | 1 | 68700 | $1.82 \times 10^{-8}$ | 57 |
| 7 repeat #4 | 4.5 | 107400 | $2.85 \times 10^{-8}$ | 89 |

Summary

Acid leaching, particularly, toward pH 1, is effective in reducing the radioactive contamination by about 40%.

EXAMPLE IX

Acid Leach of Classified Particles

The procedures of Example VIII are repeated at pH 1 only on the particles previously classified as Samples 16c', 17c' and 18c' in example V. The resultant acid leached samples are analyzed for radioactivity and the results set forth as hereinbelow.

| Sample | Starting Material | pH | Emiss/min/lb | Rems/min/lb | HMRE, ppm |
|---|---|---|---|---|---|
| 31 | 16-c' | 1 | 68700 | $1.82 \times 10^{-8}$ | 57 |
| 32 | 17-c' | 1 | 70000 | $1.86 \times 10^{-8}$ | 58 |
| 33 | 18-c' | 1 | 70000 | $1.86 \times 10^{-8}$ | 58 |
| 34 | 12 | 1 | 196900 | $5.22 \times 10^{-8}$ | 163 |
| 7 repeat #5 | — | 4.5 | 110300 | $2.92 \times 10^{-8}$ | 91 |

I claim:
1. Process for the removal of at least 30% of the initial radioactivity of kaolin and over 50% of the leachable radiogenic material which comprises
   a. degritting kaolin and forming a suspension of said degritted kaolin solids;
   b. dispersing said degritted kaolin solids in an aqueous medium to form a dispersate;
   c. slurrying said dispersate and diluting said solids with water;
   d. separating from said kaolin dispersate particles of a size less than 0.5 microns diameter, by gravitational settling, by gravitational settling in conjunction with flocculation, or gravitational settling in conjunction with leaching; said size being defined by gravitational settling, and said particles containing the radioactivity to be removed.
   e. discarding that portion of the dispersate containing particles of a diameter of less than 0.5 micron.
2. A process in accordance with claim 1 wherein said settling comprises the steps of
   a. allowing the said dispersate to settle for a predetermined time to form a settled kaolin
   b. removing from said dispersion the upper most volume thereof containing particles of a size less than 0.5 microns.
3. A process according to claim 2 additionally comprising the steps of:
   c. adding to the residue to step (b) a volume of water equivalent to the volume removed,
   d. dispersing the material to yield a second dispersate,
   e. repeating the procedures of steps (a) and (b) ad desideratum.
4. A process according to claim 3 further comprising the step of removing the settled kaolin from the aqueous medium.
5. A process according to claim 2 wherein the dispersion is carried out at a pH between 6 and 11.
6. A process according to claim 5 wherein the dispersion is carried out in the presence of an inorganic dispersing agent.
7. A process according to claim 6 wherein the dispersing agent is selected from the group consisting of tetrasodium pyrophosphate and 2-amino-2-methyl-1-propanol.
8. Process for the removal of at least 30% of the initial radioactivity of kaolin and over 50% of the leachable radiogenic material which comprises a. degritting kaolin and forming a suspension of said degritted kaolin solids,
b. dispersing said degritted kaolin solids in an aqueous medium to form a dispersate,
c. diluting said dispersate to a concentration of 5 – 15% by weight in the presence of an inorganic dispersing agent,
d. adding an aqueous solution of between 0.01 and 0.5% of mild flocculating agent to provide a flocculate, 9. A process according to claim 8 wherein the mild flocculating agent is a water soluble natural or synthetic gum.

10. A processing according to claim 8 comprising the additional step of washing the kaolin to remove the gum therefrom.

11. A process for the removal of at least 30% of the initial radioactivity of kaolin and over 50% of the leachable radiogenic material which comprises
   a. degritting kaolin and forming a suspension of said degritted kaolin solids;
   b. dispersing said degritted kaolin solids in an aqueous medium to form a dispersate;
   c. removing from said kaolin dispersate, particles of a size less than 0.5 microns diameter by acid leaching at a pH between 1 and 3, said size being defined by gravitational settling and said particles containing the radioactivity to be removed;
   d. permitting the leaching dispersate to settle;
   e. discarding the leachate;
   f. recovering the kaolin from the residue.

12. A process according to claim 11 wherein said leaching steps and settling comprise the steps of:
   i. adding sufficient mineral acid to bring the pH to between pH 1 and pH 3;
   ii. agitating sufficiently to hold the slurry in suspension for from 30 to 150 hours;
   iii. permitting the slurry to settle
   and wherein recovery of the kaolin from the residue comprises removing the supernatant liquid from said settled slurry.

13. A process according to claim 12 comprising the additional step of washing the slurry to remove the acid therefrom.

* * * * *